United States Patent Office 3,748,279
Patented July 24, 1973

3,748,279
CATALYSTS FOR PREPARING POLYCYCLIC UNSATURATED HYDROCARBONS
Alberto Greco, Antonio Carbonaro, and Geno Dall Asta, Milan, Italy, assignors to The B. F. Goodrich Company, Akron, Ohio
No Drawing. Original application May 11, 1970, Ser. No. 36,444, now Patent No. 3,661,869. Divided and this application July 2, 1971, Ser. No. 159,540
Claims priority, application Italy, May 12, 1969, 16,717/69
Int. Cl. C07c 13/54
U.S. Cl. 252—429 B       3 Claims

ABSTRACT OF THE DISCLOSURE

New doubly unsaturated polycyclic hydrocarbons having the general Formula I:

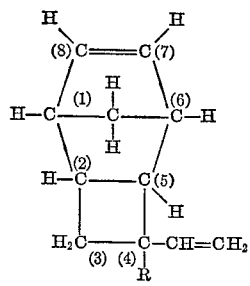

(I)

in which R is H or $CH_3$, are disclosed. Polycyclic unsaturated hydrocarbons included in Formula I are 4-vinyl-tricyclo[4,2,1,0$^{2,5}$]nona-7-ene and 4-methyl-4-vinyl tricyclo[4,2,1,0$^{2,5}$]nona-7-ene. The new polycyclic hydrocarbons having two types of unsaturation are addition products, or hetero-dimers, of bicyclo [2,2,1] hepta-2,5-diene(2,5-norbornadiene) and a conjugated aliphatic diene, such as butadiene-1,3 or isoprene, and are obtained by reacting the monomers in the presence of particular catalysts comprising zero-bis- or trivalent iron compounds, an alkyl magnesium halide and an ether.

This is a division of application Ser. No. 36,444, filed May 11, 1970, now U.S. Patent 3,661,869.

THE PRIOR ART

Various polycyclic unsaturated hydrocarbons having one or two double bonds in the cycle, and no double bonds outside the cycle, are known in the literature. For instance, such polycyclic hydrocarbons have been obtained by the catalytic dimerization of bicyclo[2,2,1] hepta-2,5-diene.

However, polycyclic unsaturated hydrocarbons of Formula I above, obtained from bicyclo[2,2,1]hepta-2,5-diene and containing unsaturations in both the cyclic and non-cyclic portions thereof, have not been reported previously.

THE PRESENT INVENTION

One object of this invention was to provide the new polycyclic unsaturated hydrocarbons containing unsaturations in both the cyclic and non-cyclic portions thereof, which unsaturations are of different types.

This and other objects are accomplished by the present invention, in accordance with which such new polycyclic unsaturated hydrocarbons are obtained by reacting bicyclo[2,2,1]hepta-2,5-diene with a conjugated aliphatic diene in the presence of a catalyst prepared, generally, from an iron compound, an organometallic compound of aluminum or magnesium, and a basic Lewis compound.

More specifically, the catalyst used in the practice of this invention is prepared from:
(a) An Fe compound;
(b) An organometallic compound of aluminum or magnesium corresponding to the general formula $$MR_nX_m$$

in which M represents Al or Mg, R represents an alkyl radical containing from 1 to 18 carbon atoms, X represents one or more halogens selected from the group consisting of bromine and chlorine, n is a whole number from 0 to the valence of M, and m is a whole number from 1 to the valence of M minus 1, the sum of $n+m$ being equal to the valence of M; and (c) A Lewis base selected from the group consisting of ethers and phosphines.

Examples of Fe compounds which may be used in preparing the catalyst include $FeCl_3$, $FeCl_2$, Fe triacetyl-acetonate and, in general, any zero-bis- or trivalent Fe compound soluble or solubilizable in the reaction medium.

As component (b) of the catalyst, it is particularly suitable to use the Al trialkyls, such as, for instance, $Al(C_2H_5)_3$ or $Al(i—CH_4H_9)_3$; the dialkyl aluminum monohalides, such as $Al(C_2H_5)_2Cl$, and Grignard compounds, such as (i—$C_3H_7$)MgCl.

When catalyst-forming component (a) is an iron compound in which the iron in the zerovalent state, such as bis-(cyclo-octatetraene) Fe, it is not necessary to use catalyst-forming component (b), since such iron compounds act, per se, as the active catalyst.

As component (c) of the catalyst, it is particularly suitable to use the diethyl ether, when (as component (b) a Mg compound is used, and triphenyl- or tritolyl-phosphine or bis-(diphenilphosphine)-ethane, when the component (b) is containing a dialkyl-aluminium monohalide.

Preferably, the molar ratio of component (b) to component (a) is from 3 to 20. Although a larger amount of the organometallic compound may be used, no particular advantage is gained by doing so.

The molar ratio of component (c) to component (a) is regulated depending on the nature of component (c) and, more particularly, on the basis of its complexing power. In any case, such ratio is at least 1.

The polycyclic unsaturated hydrocarbons of the invention are characterized in containing two different types of unsaturation, an unsaturation of the cycloolefinic type and an unsaturation of the vinylic type, external to the cyclic system.

As indicated, one of the new polycyclic unsaturated hydrocarbons within the scope of the invention is 4-vinyl-tricyclo[4,2,1,0$^{2,5}$]nona-7-ene, which corresponds to the general Formula I in which R represents hydrogen. Said hydrocarbon has the chemical composition $C_{11}H_{14}$, as revealed by elementary analysis and by mass spectrography. It is a colorless liquid which boils at 57–58° C. at 5 mm. Hg and has a refraction index $n_D^{24}=1.503$.

The infrared spectrum of said compound shows characteristics absorption bands at 14.2 and 11.0 microns, of the internal double bonds of the cis-type and of the vinyl group, respectively. The nuclear magnetic resonance spectrum agrees with the structure indicated.

Another new polycyclic hydrocarbon within the scope of the invention is 4-methyl-4-vinyl-tricyclo[4,2,1,0$^{2,5}$] nona-7-ene, which corresponds to general Formula I in which R represents a methyl group. It has the chemical composition $C_{12}H_{16}$, as revealed by the elementary analysis, and by mass spectrography. It is a colorless liquid which boils at 65° C. to 67° C., at 1 mm. Hg. The infrared spectrum of this compound is similar to that for the 4-vinyl-tricyclo[4,2,1,0$^{2,5}$]nona-7-ene, except that it shows, in addition, an absorption band at 7.3 microns which is typical for the methyl group. The nuclear magnetic resonance spectrum agrees with the structure indicated.

A particularly suitable process for obtaining 4-vinyl-tricyclo[4,2,1,0$^{2,5}$]nona-7-ene involves the use of a catalytic system prepared from Fe triacetylacetonate, Al($C_2H_5$)$_2$Cl, and bis(-diphenylphosphine) ethane. The preferred process for obtaining the 4-vinyl-4-methyl-tricyclo[4,2,1,0$^{2,5}$] nona-7-ene involves use of a catalytic system prepared from $FeCl_3$, (i—$C_3H_7$)MgCl, and diethyl ether.

The addition reaction between bicyclo[2,2,1]hepta-2,5-diene and butadiene-1,3 or isoprene, which is promoted by the catalysts disclosed herein, may be carried out in an inert diluent such as, for instance, a hydrocarbon solvent, for example, benzene, toluene, n-heptane, etc. The addition reaction may also be carried out in the absence of an extraneous diluent, by using the monomers in the liquid state, or by using an excess of the catalyst-forming component (c) as diluent.

The reaction can be carried out at temperatures within a fairly wide range. In general, a temperature of from 0° to 80° C. is used.

According to one presently preferred method of operating, the various catalyst-forming components are contacted successively with the monomers.

In general, it is preferred to use an excess of the aliphatic dienic monomer with respect to the stoichiometric, in order to avoid the formation of homo-dimers of the bicyclohepta-diene simultaneously with the formation of the hetero-dimer of bicycloheptadiene and the aliphatic diene.

The polycyclic unsaturated hydrocarbon I can be recovered from the reaction mass by distillation. Any bicycloheptadiene and/or butadiene-1,3 or isoprene which is not reacted can be recovered easily during the distillation.

The polycyclic unsaturated hydrocarbons of the invention can be used as intermediates for the production of many useful products. For instance, the new hydrocarbons can be readily chlorinated and transformed into compounds having pesticidal properties.

Moreover, because these new doubly unsaturated polycyclic hydrocarbons contain the two unsaturations of different types, they can be polymerized in admixture with ethylene and higher alpha-olefins such as propylene and butene-1, to obtain unsaturated copolymers which are elastomers that can be cross-linked (vulcanized) to provide new synthetic rubbers.

The following examples are given to illustrate the invention and are not intended to be limiting.

EXAMPLE 1

The air in a thick-walled glass vial, provided with a lateral outlet, was replaced by dry $N_2$ and thereupon there were introduced, in the given order:

Fe triacetylacetonate—0.180 g.
Bis(diphenylphosphine) ethane—0.400 g.
Benzene—10 cc.
Bicyclo[2,2,1] hepta-2,5-diene—20 cc.
1,3-butadiene (in the liquid state)—20 cc.
Al($C_2H_5$)$_2$Cl—1.2 cc. (diluted in 5 cc. of benzene)

The filled vial was then flame-sealed and immersed into a bath at 80° C. for 3 hours.

The new reaction solution, diluted with 50 cc. of diethylether, was then treated in a separatory funnel with water acidulated with HCl: the organic layer was successively washed with $H_2O$ and then dried on anhydrous $Na_2SO_4$.

The remaining solution was then distilled under vacuum, thereby were gathered 3.3 g. of a compound having the following characteristics: boiling temperature= 57–58° C. at 5 mm. Hg. $n_D{}^{24}$=1.503. C=82.05%. H= 7.85%. This compound proved to have a structure corresponding to Formula I hereinabove R being hydrogen; a further fraction (5 g.) was obtained at 73–74° C. having an $n_D{}^{26}$=1.5233 and, by chemical analysis, was shown to also have the chemical composition $C_{11}H_{14}$.

EXAMPLE 2

Into a vial as used in Example 1, there were introduced:

$FeCl_3$—0.15 g.
Diethylether—1.5 cc.
Bicyclo[2,2,1]heptadiene-2,5—3 cc.
Isoprene—10 cc. and after cooling down to −78° C.
(i—$C_3H_7$)MgCl—2.5 cc. (of ether solution 2, 14 molar)

The reaction was carried out at 50° C. for 20 hours.

From the raw, final solution were then separated (isolated), by chromatography, 0.8 g. of a compound having the following characteristics: C=89.93%, H= 10.05%, molecular weight by mass spectrography=160, boiling point=65–67° C. at 1 mm. Hg.

To the compound was, therefore, attributed the chemical formula $C_{12}H_{16}$. By spectrographic (I.R. and N.M.R.) analysis, this compound was found to correspond to Formula I, R being a methyl group.

EXAMPLE 3

This example is concerning the preparation of an ethylene/propylene/4 - vinyl - tricyclo[4,2,1,0$^{2,5}$]nona-7-ene elastomeric copolymer.

The co-polymerization was carried out in a glass cylinder of 12 cm. diameter and 4,500 cc. holding capacity, provided with stirrer and thermometer; the gas inlet was at the bottom of the vessel and ended with a porous section.

Into the apparatus maintained at −20° C. by immersion in a thermostatic bath, there were introduced:

n-heptene—3.000 cc.
Diethyl zinc—0.2 millimole
4-vinyl-tricyclo[4,2,1,0$^{2,5}$]nona-7-ene—4 cc.

Through the gas inlet a propylene-ethylene mixture in a molar ratio 3:1 was then introduced and the gaseous mixture was kept circulating at a rate of 1,200 Nl/h.

After 30 minutes, after saturation was reached 6 millimols of aluminum diethylmonochloride were introduced into the reactor together with 0.1 millimole of vanadium triacetylacetonate dissolved in 1.5 cc. of toluene and the recycle of the ethylene-propylene mixture was continued further on; after 40 minutes from the introduction of the catalyst, the reaction was broken by the addition of 10 cc. of methanol.

The product was then purified in a separatory funnel by means of repeated washings with diluted hydrochloric acid and subsequently with water; finally it was coagulated with an acetone-methanol mixture.

After vacuum drying 29 g. of a solid product were obtained having the appearance of a non-vulcanized elastomer, completely soluble in n-heptane.

Under infrared spectrographic analysis the polymer proved to contain 41% by weight of propylene; moreover, the spectrum showed the presence of vinyl groupings (band at 11.0μ). The contents in 4-vinyltricyclo [4,2,1,0$^{2,5}$] nona-7-ene (as determined through the reaction with iodium chloride) amounted to 1.8% by weight.

100 parts by weight of copolymer were then admixed with 5 parts zinc oxide, 80 parts ISAF carbonblack, 55 parts Flexon oil 766, 0.75 part mercaptobenzothiazol, 1 part stearic acid, 1.5 parts tetramethylthiurame monosulphide and 1.5 parts sulphur.

This mixture was vulcanized in a press for 60 minutes at 150° C. Thereby a vulcanized plate was obtained having the following properties:

Tensile strength—264 kg./cm.$^2$
Elongation at break—600%
Elastic modulus at 200%—49 kg./cm.$^2$
Elastic modulus at 300%—100 kg./cm.$^2$
Compression set—18%

What is claimed is:

1. A catalyst system consisting essentially of (A) an iron compound selected from the group consisting of iron halides, iron triacetylacetonate and bis-(cyclooctatetraene) iron, (B) an organometallic compound of the formula RMgX wherein R is an alkyl radical containing 1 to 18 carbon atoms and X is bromine or chlorine and (C) diethyl ether, in a molar ratio of (B) to (A) of 3 to 20, and 0 to 20 when (A) is in the zero valent state, the molar ratio of (C) to (A) is at least one.

2. The catalyst of claim 1 wherein (A) is ferric chloride or ferrous chloride.

3. A catalyst system consisting essentially of (A) $FeCl_3$, (B) isopropyl magnesium chloride and (C) diethyl ether, in a molar ratio of (B) to (A) of 3 to 20 and a molar ratio of (C) to (A) of at least one.

References Cited
UNITED STATES PATENTS

| | | | |
|---|---|---|---|
| 3,152,088 | 10/1964 | Sandri et al. | 252—429 B |
| 3,405,194 | 10/1968 | Iwamoto et al. | 252—429 BX |
| 3,408,418 | 10/1968 | Iwamoto et al. | 252—429 BX |
| 3,359,337 | 12/1967 | Rick | 252—429 BX |

PATRICK P. GARVIN, Primary Examiner

U.S. Cl. X.R.

252—431 R, 431 P